United States Patent [19]

Hulderman et al.

[11] Patent Number: 5,579,008
[45] Date of Patent: Nov. 26, 1996

[54] ELECTRONIC LICENSE PLATE APPARATUS AND METHOD

[75] Inventors: Garry N. Hulderman, Riverside; Allen C. Hagelberg, Upland, both of Calif.

[73] Assignee: Hughes Missile Systems Company, Los Angeles, Calif.

[21] Appl. No.: 502,796

[22] Filed: Jul. 14, 1995

[51] Int. Cl.⁶ .................................................. G01S 13/80
[52] U.S. Cl. .............................. 342/44; 342/45; 342/51
[58] Field of Search ............................ 342/51, 43, 44, 342/45, 42, 5, 6; 340/825.54, 825.61

[56] References Cited

U.S. PATENT DOCUMENTS

| | | | |
|---|---|---|---|
| 4,358,763 | 11/1982 | Strauch | 342/51 |
| 4,625,208 | 11/1986 | Skeie et al. | 342/51 |
| 5,164,734 | 11/1992 | Fredericks et al. | 342/172 |
| 5,254,997 | 10/1993 | Cohn | 342/44 |
| 5,291,204 | 3/1994 | Danzer | 342/44 |

*Primary Examiner*—Ian J. Lobo
*Attorney, Agent, or Firm*—Charles D. Brown; Wanda Denson-Low

[57] ABSTRACT

Apparatus and method for conveying information from an object by delayed reflection of an interrogating ultra-high range resolution radar signal which is digitized into a series of programmable spaced pulses by an electronic license plate circuit. The electronic license plate includes a plurality of unique programmable delay lines connected through a coupler network to an antenna.

13 Claims, 5 Drawing Sheets

ELECTRONIC LICENSE PLATE APPARATUS AND METHOD

FIELD OF THE INVENTION

This invention relates generally to processing and time spaced reflection of interrogating radar signals that are received by an object, and more particularly, forming a digitally encoded, passively reflected message pursuant to a transmitted ultra high range resolution radar signal using a linear frequency modulated waveform.

BACKGROUND OF THE INVENTION

Those interested in obtaining information about objects when using radar have relied primarily on two types of methods. One of them requires the object to have an active transmitter that transmits a signal in response to an interrogating radar signal. An example of this type system is commonly referred to as IFF (Identification Friend or Foe). The other method relies on the physical characteristics of the object to shape the reflected interrogating signal, from which the receiver derives information.

A more specific example of the first method is embodied in U.S. Pat. No. 3,270,338. This patent utilizes a radar transmitter that generates a pulse train. A "coded station" then receives the pulse train and, based on a predetermined code, transmits a pulse train which contains station dependent information. This patent is illustrative of an identification system where the object or "target" actively transmits a signal based on the interrogation signal.

Inherent disadvantages to the above method include the added costs and complexity of an active receiver/transmitter at the recipient station. Moreover, in hostile environments, transmitting an active signal facilitates location of the object's position by adversaries.

While relying on an active transmitter to convey information from interrogating signals has inherent disadvantages, employing the second method which uses no processing means and merely reflects the interrogating signal is also inadequate under certain circumstances. An example of this method can be seen in U.S. Pat. No. 3,247,514. This patent uses microwaves to identify railroad cars. Each railroad car is identified by a predetermined set of reflector elements. Depending upon the shape and configuration of the reflectors, information about the particular railroad car will be reflected back to the transmitter/receiver.

While this method does not have the added cost and complexity of an active transmitter, it requires physical alteration of the object or the installation of reflectors in order to reprogram or modify the reflected information. Moreover, the reflected signal may be weak and noisy thereby reducing range and sensitivity.

Another example of using an RF interrogating signal and returning a coded signal is shown in U.K. patent 1,433,140. A signal is received through a transducer in an acoustic surface wave delay line. Several transducers, each with a dipole antenna, are connected at spaced locations along the delay line. The outputs of the dipoles are selectively encoded by means of a mask having holes therethrough. Where a hole corresponds in position to a dipole, a delayed signal is transmitted. Thus a physical masking arrangement is employed to create a reflected code. The frequencies involved are in the 10,000 MHz range.

The need for positive yet reasonably secure identification of objects has become evident from events involving friendly forces being mistakenly attacked by other friendly forces, where visual identification was not conveniently possible before the tragic attack was made. Because of the ranges and speeds involved in current weaponry, the identification challenges have been accentuated. Because of positive identification limitations, the full capabilities of some armaments cannot be fully explained.

Although the IFF (as a general term) problem has existed throughout the history of warfare, the tempo of modern battle coupled with the range and lethality of modern weapons systems require a material solution to minimize the inadvertent destruction of friendly forces. Weather is not a factor in detecting a target, nor is range limited to line of sight. Positive identification of targets has lagged the ability to detect and destroy them.

Another factor which aggravates the IFF problem is non-linearity of the battlefield. Overlapping islands of conflict, increased weapons ranges and the confusion that occurs during rapid movement of tactical forces increase the need for passive and active IFF systems.

SUMMARY OF THE INVENTION

The present invention provides a method and apparatus to process and reflect an interrogating signal, thereby providing detailed programmable information in a cost effective and countermeasure robust manner. It is referred to as an electronic license plate (ELP). It is at least a mid-term solution to the problem of beyond visual range identification by systems employing automated and RF means for aiming or guidance, or both.

More specifically, the invention provides an inexpensive apparatus which, upon being interrogated by a radar signal, passively reflects a programmable digital code. Ultra high range resolution (UHRR) radar interrogating signals at very low power levels are employed, preferably utilizing a linear frequency modulated (LFM) radar signal waveform. The reflected digitized radar signal may represent any desired information about the object. Typically it provides identifying information, which is why it is termed an electronic license plate.

In one embodiment, an antenna is used to intercept the UHRR radar signals. The radio frequency (RF) energy is then passed through circulators to couplers where it is divided among switchable delay lines. Each delay line represents a unique delay of the signal which can be electronically positioned in an absorptive or reflective state. In the reflective state, the position of the signal will be redirected back through the delay line coupler network, and back through the circulators and amplifier and re-radiated out of the antenna. In the absorptive state, the energy will be terminated in the load with no radiation from the delay network. Each reflective element in the ELP circuit returns a portion of the LFM pulse in time space so as to represent a separate digital coded bit. Thus, by programming the switchable delay lines, the interrogating signal is processed into a discrete binary code which is detected, analyzed, processed and displayed at the interrogating source, or at a location coupled to the interrogating source.

BRIEF DESCRIPTION OF THE DRAWING

The objects, advantages and features of this invention will be more readily perceived from the following detailed description, when read in conjunction with the accompanying drawing, in which:

FIG. 4 shows an aircraft with a detailed reflected return signal from the aircraft structure itself;

FIG. 5 is a digitized coded message return as might be reflected by the FIG. 1 circuit mounted in the aircraft of FIG. 4;

DESCRIPTION OF THE PREFERRED EMBODIMENTS

The electronic license plate (ELP) of this invention is an RF device designed to reflect RF signals which are illuminating a ground combat vehicle, for example, and encrypt a code on the reflected signal representing the vehicle or object identification by type, call sign, or status.

Figure 1:
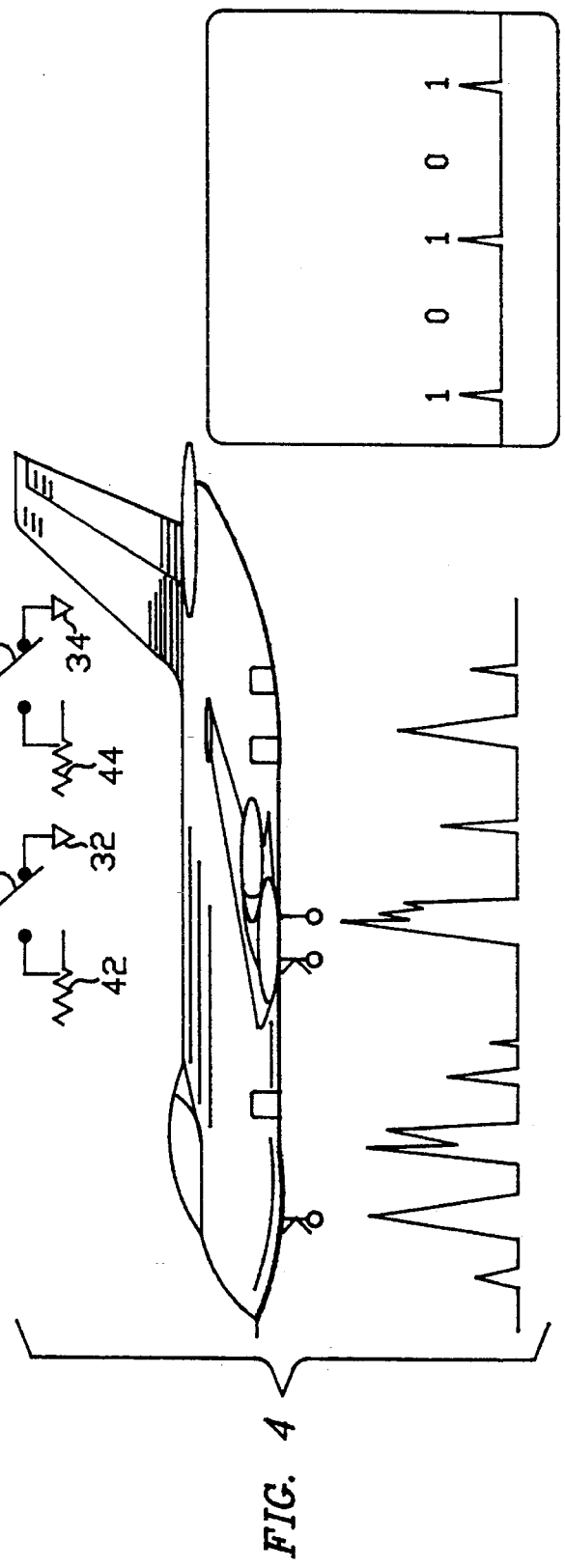
FIG. 1 is a schematic diagram of the invention.

With reference now to the drawing, FIG. 1 represents a schematic of a preferred embodiment of the (ELP) apparatus of the invention. A pulse of radio frequency (RF) energy or interrogative radar signal from a typical radar transmitter/receiver is intercepted by antenna 11. The signal then passes through circulators 12 and 13 and on down transmission line 18. Couplers 14 then divide the signal off the transmission line among switchable delay lines 15, 16, 17, 21 and 22. Each delay line represents a unique delay of the signal. One embodiment has delay lines 15, 16, 17, 21 and 22 being five-, four-, three-, two- and one-foot delay lines, respectively. Each delay line can be selectively electronically positioned in an absorptive state or a reflective state by respective switch 23, 24, 25, 26 or 27. In the reflective state, that portion of the energy coupled to that delay line will be redirected by reflection element 31, 32, 33, 34 or 35 back through its delay line, through coupler 14, back through circulators 12, 13 and amplifier 36, and reradiated out of antenna 11. A typical amplifier gain would be 25 dB but can be set to any desired cross-section return. Each reflective element returns a portion of the signal in time space so as to represent a separate digital coded bit. Thus the combined reflected bits constitute a digital word, each bit of which is programmable.

In the absorptive state, the energy will be terminated in loads 41, 42, 43, 44 or 45 with no reflection back through the delay network and no reradiation from antenna 11. These signal absorbing elements may be as simple as resistors connected to ground.

Figure 2:
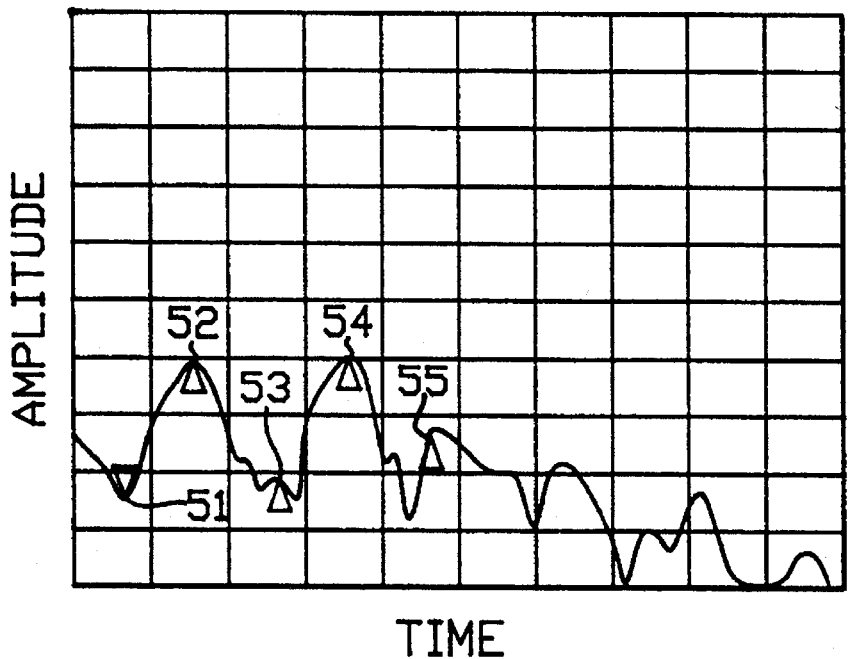
FIG. 2 shows a typical reflected return signal that has been processed by the invention.
Figure 3:
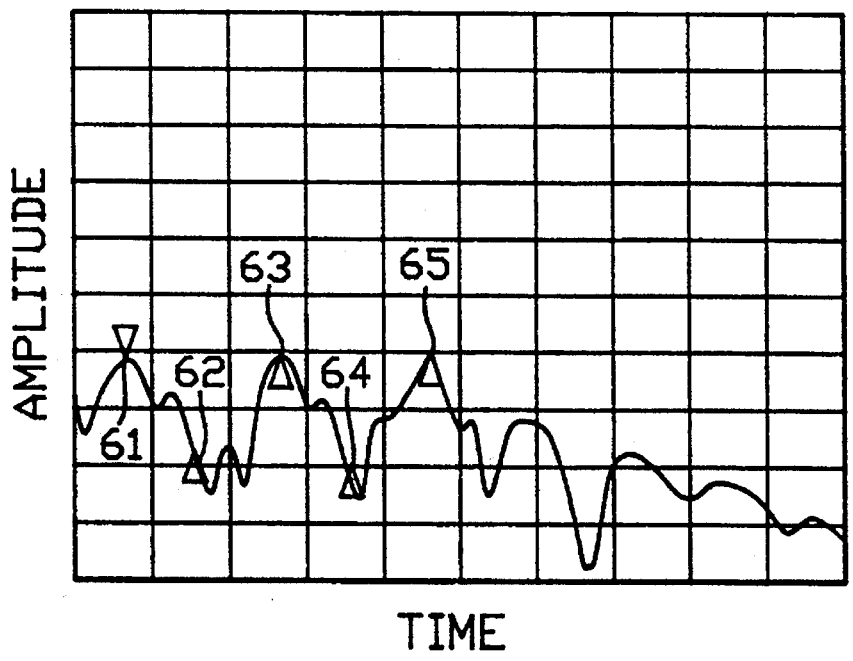
FIG. 3 shows a different typical reflected return signal that has been processed by the invention.

Although it is suggested that the heart of the arrangement of FIG. 1 is a surface acoustic wave delay line, other approaches such as a coupled-fiber-optic delay line might work well. The purpose of the multi-tap, non-dispersive delay line is to provide a sequence of predictable delay outputs of the interrogation waveform. Only five taps are shown in FIGS. 2 and 3, but as many as 30 such taps may be used. The more taps, the more detailed the information provided by the ELP may be.

In the preferred embodiment of this invention, the ELP circuit is interrogated with a pulse from an ultra high range resolution (UHRR) radar using a linear frequency modulated (LFM) waveform. The frequency of the transmitted UHRR radar signal typically ranges between 100 MHz and 100 GHz, and the bandwidth is preferably in the range of 1 to 10 GHz (1 to $10 \times 10^9$). The pulse width of the UHRR signal has a maximum duration of about 20 ns. The bandwidth of the LFM signal is about 27 MHz maximum and the stepped frequency also has a bandwidth of a maximum of about 27 MHz.

Figure 8:
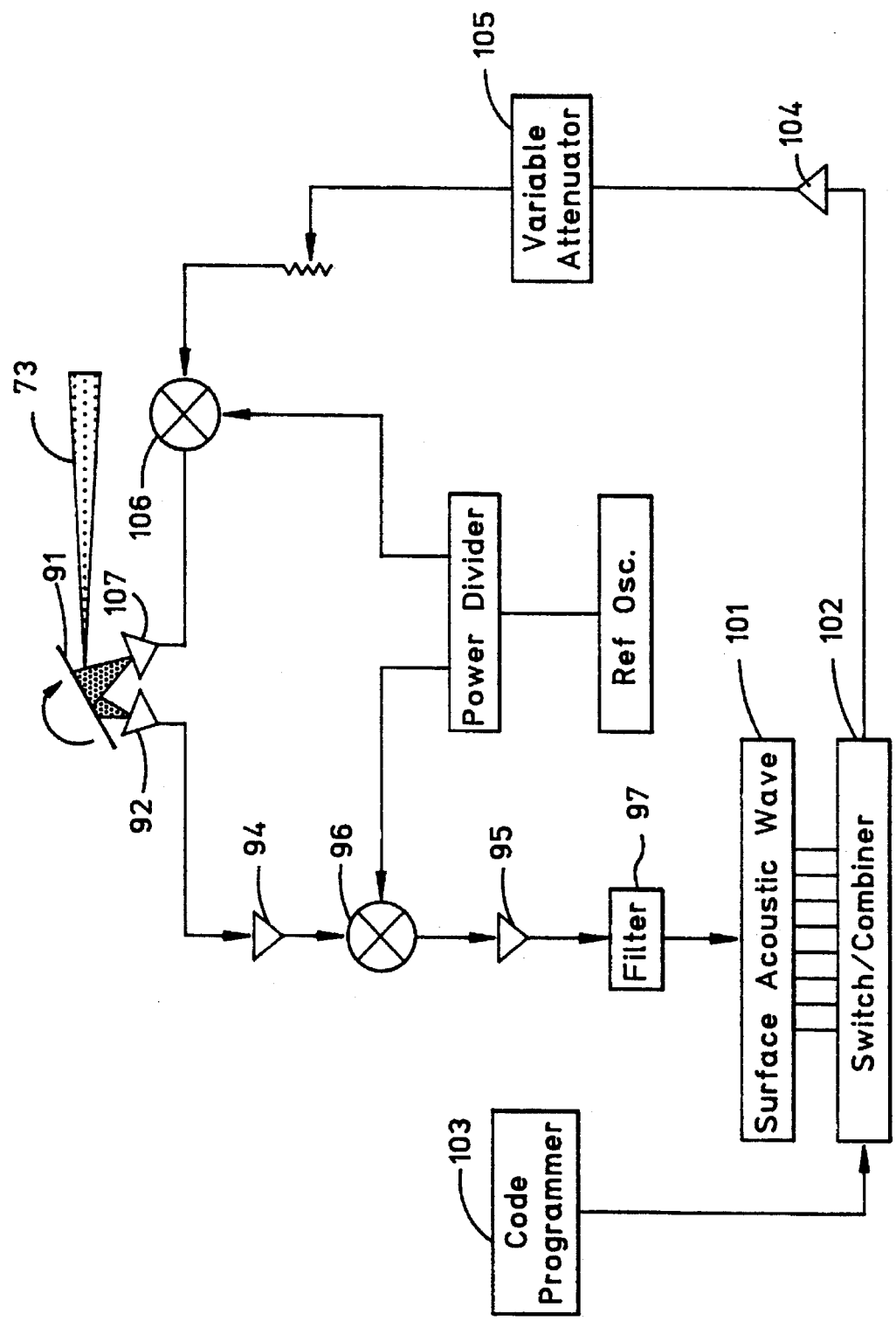
FIG. 8 is a functional schematic and block diagram of the coding signal return apparatus of this invention.

A functional block diagram of the FIG. 1 circuit is provided in FIG. 8. The incoming interrogation beam is reflected from reflective plate 91, rotating, for example, at 10 cps, to receiving horn 92. From there the signal is processed through amplifiers 94, 95, converter 96 and filter 97 to enter the programmable delay line, represented as surface acoustic wave 101, switch/combiner 102 and code programmer 103. The now digitally coded signal then passes through 1F amplifier 104, variable attenuator 105, and up converter 106 to output horn 107 and off reflective plate 91 as a 35° output beam 73.

A screen at the receiver used for reading such signal returns would preferably be in the form of an A-scope which shows amplitude versus time. An example of such a scope trace is shown in FIG. 2 which represents a typical return signal from the ELP of the FIG. 1 configuration. Time spaced positions 51, 52, 53, 54 and 55 provide the basic information for the digital word. Note that there are peaks at 52 and 54, while positions 51, 53 and 55 are not peaks. This corresponds to a digital word 01010. Peaks 52 and 54 are generated by switches 24 and 26 in FIG. 1 set to the reflective state, while positions 51, 53 and 55 in FIG. 2 correspond to switches 23, 25 and 27 set to the absorptive or terminal state.

FIG. 3 represents a return signal trace with an alternatively programmed code. Positions 61, 63 and 65 would represent an ELP circuit in which switches 24 and 26 in FIG. 1 are connected to terminations 42 and 44, respectively. This corresponds to a digital word 10101.

FIG. 5 is an electronically filtered representation of the same digital word return signal as shown in FIG. 3.

FIG. 4 shows a typical return of an interrogative signal reflected from an aircraft without the use of an ELP. This shows the noisy and target orientation dependent, directly reflected UHRR signal, while FIG. 5 represents a delayed reflected signal from the ELP mounted in the FIG. 4 aircraft. The ELP receiving antenna on the "target" rotates as the ELP signal is not object orientation dependent and is easily programmable. Object identification is thus very precise and relatively simple, without the use of a more costly transmitter. The ELP circuit is associated with an object about which digital information is being read. The circuit may be mounted on the object, such as an aircraft, or mounted nearby, such as for a surface-movable object or stationary installation.

By reflecting the signal at a delayed time, the return will be in the clear after the aircraft-reflected signature. For example, the directly reflected signal of FIG. 4 is followed in time by the FIG. 5 ELP signal. It is anticipated that the delay, in distance terms, will be in the range of 20 meters behind the vehicle signature echo. By delaying each reflective element of the return signal, one obtains that portion of the energy directed to a reflective delay line and at a later time, thereby providing a stronger, less noisy return for a decoder to unscramble. Since each bit return will be a frequency sweep in time with the local oscillator, no difficult phasing problems occur.

Countermeasures with respect to ELP information would be relatively difficult because energy is reflected only. The ELP does not incorporate a transmitter. Therefore, the system does not have to rely on originated, transmitted signals that may be susceptible to jamming or be more easily detected.

Figure 6:
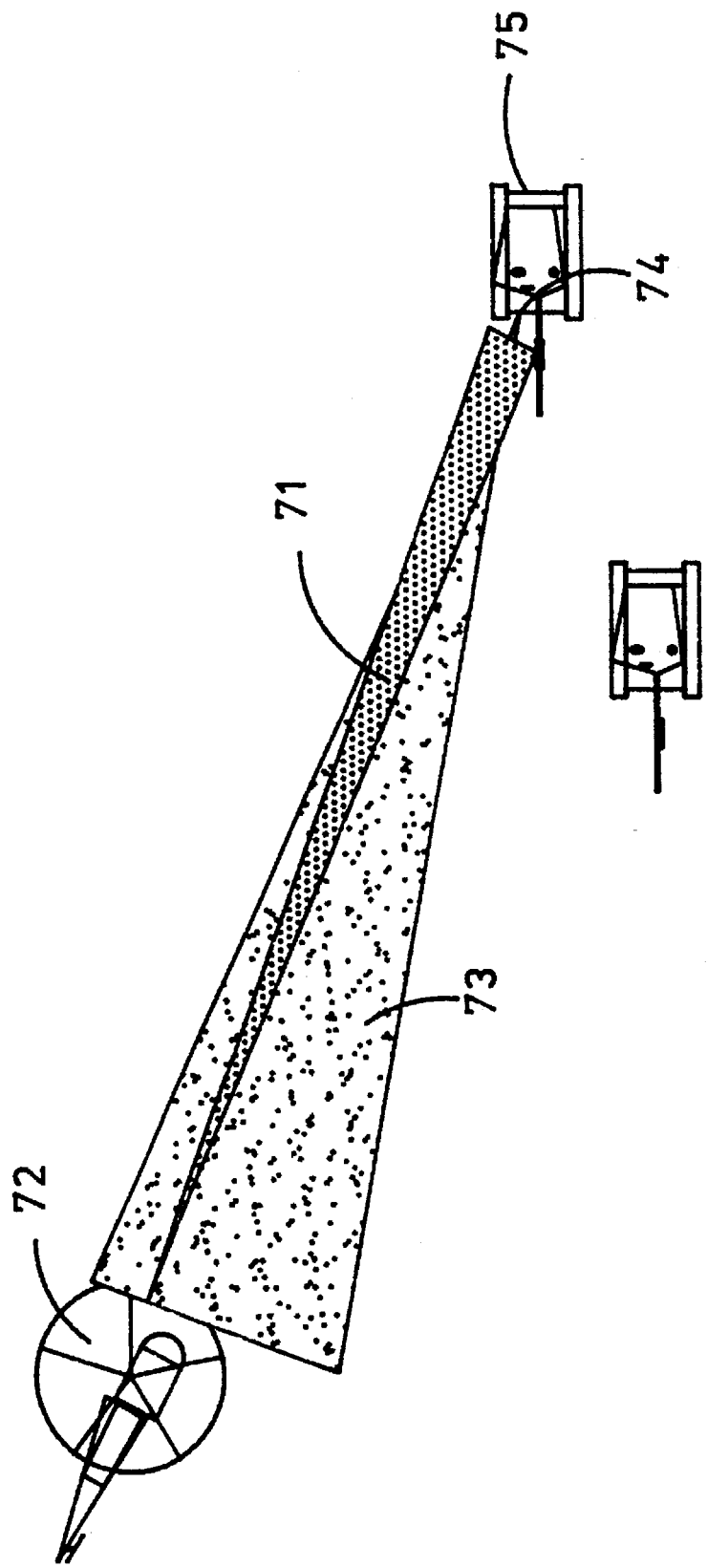
FIG. 6 schematically depicts an interrogator source and a reflective target with the signal beams transmitted and returned in accordance with the invention.

With reference to FIG. 6, it can be seen that other factors are involved in preventing detection of the ELP communications. The interrogating beam 71 from vehicle 72 is preferably a narrow cone of about 3° and reflected beam 73 from ELP 74 mounted on object 75 is preferably about a 35° coded wave form. The interrogating beam is low power, preferably in the range of 0.1 watt, with the reflected power at 0.0001 watt. The ELP device provides 360° azimuth coverage because its reflector continuously rotates. The ELP reflector antenna is preferably inclined to 10° in elevation so that, with a 35° reflected beam, complete altitude coverage is provided. The rotation rate of the preferred embodiment is 600 rpm, intercepting the interrogator beam for a period of 10μsec.

Figure 7:
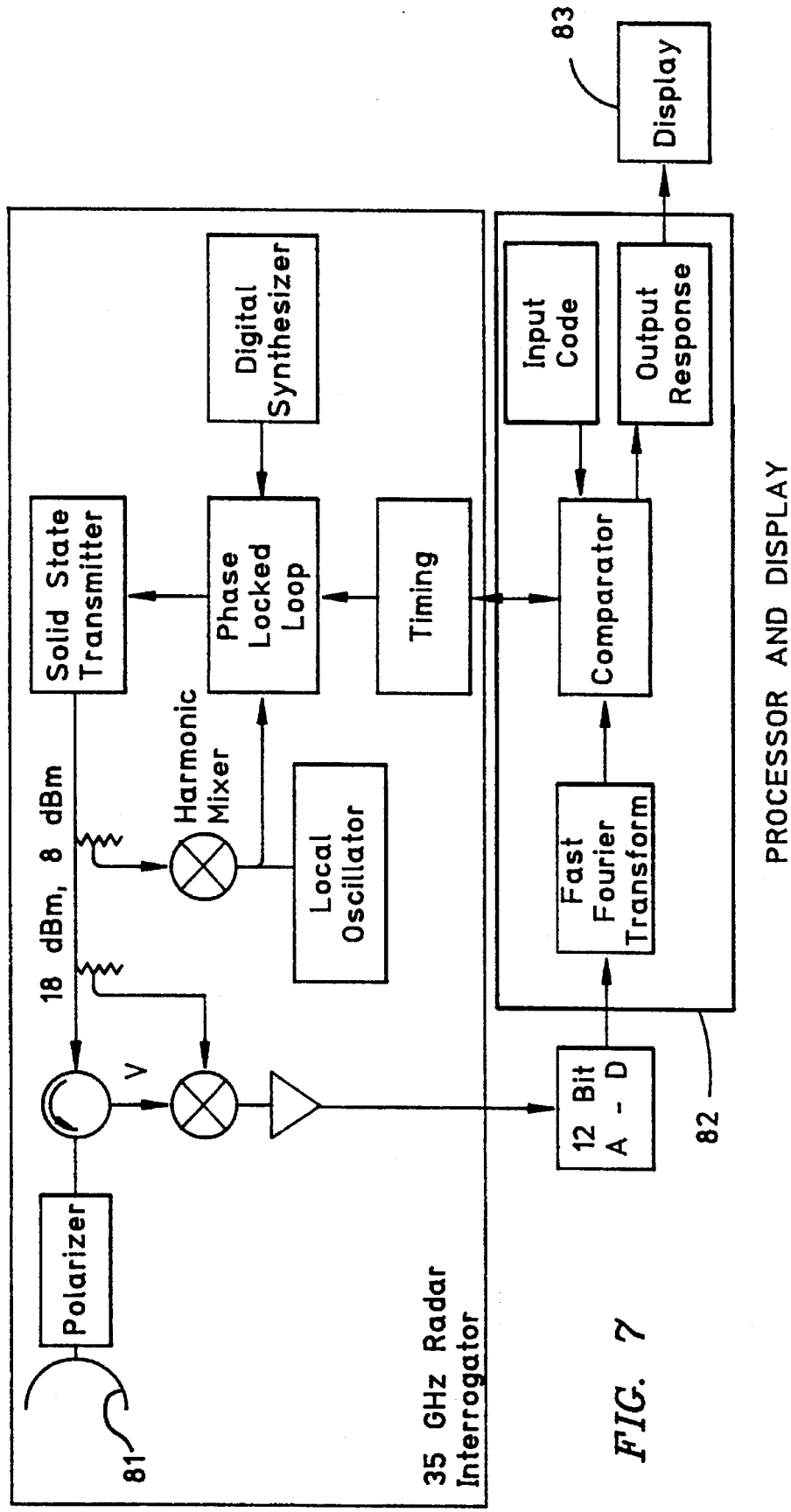
FIG. 7 is a functional block diagram of the interrogator/receiver and display of the invention.

As presently envisioned, and in a test embodiment, the interrogator is a circularly polarized, high range resolution millimeter-wave (MMW) radar (35 GHz). A code processor with associated software provides a readout of the interrogated target and its corresponding identification. The functional block diagram of the interrogator and display is shown in FIG. 7. This block diagram is self explanatory, with all of the blocks labeled. The interrogation signal is transmitted from antenna 81. The reflected signal is received back at the same antenna. The coded response signal is processed in processor and display 82. Display block 83 may be the A-scope of FIGS. 2, 3 or 5. The processor and display converts the incoming reflected signal to a digital code.

Thus, based on its low power and ability to transmit only in the queried direction, the ELP is countermeasure robust and provides the IFF signal only to friendly forces. The ELP operates beyond maximum normal weapon engagement ranges, in all environmental conditions, and does not compromise friendly positions or intent. It is a low cost, low weight, low power, low volume device for the passive, cooperative identification of ground and airborne vehicles. The actual ELP installation is expected to be approximately eight inches in diameter, eight inches tall and weigh about five pounds.

Other applications of the ELP include the use of identifying information on ground objects. An ELP could be used by ground vehicles to identify friend or foe to aircraft in hostile environments. Or it could be used by a downed pilot in a hostile area, or at sea near an enemy shore. He could safely respond by reflecting a signal to the search and rescue aircraft without transmitting a signal that could be used for location by an unfriendly entity.

In addition, civilian aircraft could utilize the ELP in landing patterns. Commercial aircraft following one another in a landing pattern could be assigned an ELP number. The assigned switch setting can be manually or electronically achieved in a matter of seconds. On-board search radar could then interrogate a preceding aircraft to determine if it is in the correct slot.

Since the reflected signal is passive, actual digital messages can be communicated between parties. For example, if the ELP has eight-bit resolution, one could hook it up to a computer keyboard and send all 128 ASCII characters coded with a parity check.

In view of the above description, it is likely that modifications and improvements will occur to those skilled in the art which are within the scope of the accompanying claims.

What is claimed is:

1. An apparatus for association with an object for providing a reflective return digital coded message in response to a signal from an interrogating radar, said apparatus comprising;

means associated with the object for receiving the interrogating radar signal;

means coupled to said receiving means for transmitting the interrogating signal within said apparatus;

a plurality of coupling means positioned along said transmitting means for dividing off said transmitting means a portion of the received interrogating signal;

delay line means coupled to each said coupling means, each said delay line means being unique to all other said delay line means;

means coupled to each delay line means for selectively reflecting or absorbing each delayed signal passing through said respective delay line means; and means for reradiating from said apparatus the uniquely delayed reflected pulses, thereby forming a digital word comprised of the reflected pulses, which reradiated digital word is time spaced from the interrogation radar signal and from any such interrogation radar signal reflected from said object.

2. The apparatus recited in claim 1, wherein said interrogating signal is a pulse from an ultra high range resolution radar (UHRR) transmitter.

3. The apparatus recited in claim 2, wherein said UHRR radar uses a linear frequency modulated (LFM) waveform.

4. The apparatus recited in claim 1, wherein said receiving means and said reradiating means is an antenna.

5. The apparatus recited in claim 1, wherein each said selectively reflecting or absorbing means comprises a switch operable between a reflection element and a terminating load.

6. The apparatus recited in claim 1, said apparatus further comprising:

circulator means between said receiving means and said transmitting means; and an amplifier coupled to said circulator means.

7. A method for providing a reflective return digital coded message from an electronic license plate (ELP) circuit at an object when interrogated by a transmitted radar signal, said method comprising the steps of:

receiving the transmitted radar signal at the object by receiving means;

transmitting the received radar signal from the receiving means within the ELP circuit;

dividing portions of the received signal off the transmitting means to each of a plurality of unique delay lines;

selectively programming each delay line to be either reflective or absorptive; and reradiating the reflected delay signal portions from the receiving means back toward the radar transmitter in the form of a digital word.

8. The method recited in claim 7, wherein the radar signal is received and reradiated by means of an antenna coupled to the ELP circuit.

9. The method recited in claim 7, wherein the dividing step is accomplished by a plurality of couplers, one between each delay line and the transmitting means.

10. The method recited in claim 7, wherein the delay lines are programmed by means of a switch selectively connecting the output of each delay line to a reflector or to a terminating load.

11. The method recited in claim 7, wherein the delay time of each delay line is different from all the other delay lines.

12. The method recited in claim 11, wherein the delay times are regularly spaced.

13. The method recited in claim 7, wherein the transmitted radar signal is a pulse from an ultra high range resolution (UHRR) using a linear frequency modulated (LFM) wavelength.

* * * * *